United States Patent

[11] 3,617,460

[72] Inventors Irwin H. Krull;
Charles A. Mask, both of Garden Grove, Calif.
[21] Appl. No. 885,904
[22] Filed Dec. 17, 1969
[45] Patented Nov. 2, 1971
[73] Assignee Beckman Instruments, Inc.

[54] ELECTRODE ASSEMBLY
12 Claims, 6 Drawing Figs.
[52] U.S. Cl. .................................................. 204/195, 204/1 T
[51] Int. Cl. .................................................. G01n 27/46
[50] Field of Search .......................................... 204/1 T, 195

[56] References Cited
UNITED STATES PATENTS

| | | | |
|---|---|---|---|
| 3,188,285 | 6/1965 | Watanabe et al. | 204/195 |
| 3,429,785 | 2/1969 | Ross | 204/1 T |
| 3,434,953 | 3/1969 | Porter et al. | 204/195 |
| 3,438,886 | 4/1969 | Ross | 204/195 |
| 3,442,782 | 5/1969 | Shiller et al. | 204/195 |
| 3,467,590 | 9/1969 | Gibson et al. | 204/195 |
| 3,476,672 | 11/1969 | Snyder et al. | 204/195 |
| 3,497,424 | 2/1970 | Ross | 204/195 |

Primary Examiner—T. Tung
Attorneys—Thomas L. Peterson and Robert J. Steinmeyer

ABSTRACT: An electrochemical electrode assembly for making ion concentration measurements in which a capillary tube open at its rear end and closed by an ion-sensitive barrier at its forward end is removably mounted in a tubular electrode body. A conductor fixedly mounted at the rear end of the tubular body extends through the open rear end of the capillary tube for connection to an internal half cell immersed in electrolyte in the tube. Due to the surface tension of the electrolyte on the wall of the capillary tube, the electrolyte will not escape through the open end of the tube during normal handling of the electrode assembly. In one embodiment, an organic ion exchanger liquid is provided in the capillary tube between an ion-permeable membrane at the forward end of the tube and the electrolyte in which the half cell is immersed. The surface tension of the two liquids on the wall of the capillary tube ensures that the ion-exchanger liquid will not be displaced by the electrolyte and, therefore, the ion exchanger will remain in contact with the membrane.

PATENTED NOV 2 1971　　3,617,460

INVENTORS
IRWIN H. KRULL
CHARLES A. MASK

BY Thomas L. Peterson
ATTORNEY

ELECTRODE ASSEMBLY

BACKGROUND OF THE INVENTION

1. Field of the Invention

This invention relates generally to an electrochemical electrode assembly for measuring the ion concentration or activity of a solution and, more particularly, to an improved construction for such an electrode.

2. Description of the Prior Art

In a conventional ion-measuring system, a reference electrode containing an internal half cell contacts the sample via a liquid junction. A sensing electrode assembly carrying an ion-sensitive barrier and another internal half cell contacts the sample at the barrier surface. An electrical potential is developed at the surface of the barrier in contact with the sample solution and the magnitude of this potential varies as a function of the ion concentration of the solution. This potential is ordinarily determined by measuring the potential difference existing between the two half cells.

A wide variety of ion-sensitive barriers have been utilized in such sensing electrode assemblies. The best known form of barrier is one made of hydrogen ion-sensitive glass which is shaped as a bulb and closes the end of a glass salt bridge tube. Other ion-sensitive glasses which have been utilized are sensitive to sodium and potassium ions. Also, ion-sensitive electrodes are available employing barriers formed of various metal halides, for example silver chloride and lanthanum fluoride, which are sensitive to chloride and fluoride ions, respectively. More recently, there has been introduced upon the market a variety of ion-measuring electrodes employing ion-exchanger materials in the ion-sensitive barriers thereof, which exchangers are capable of exchanging ions with the sample solutions. One of such ion exchanger electrodes employs an organic ion exchanger liquid which is retained in the electrode by means of an ion-permeable barrier such as cellophane or a filter paper. In another form of an ion exchanger electrode, the ion exchanger is incorporated in a solid plasticlike material, such as collodion, which forms a solid, homogeneous barrier that is substantially immiscible with the sample solution. The principal embodiment of the present invention will be described in detail in connection wit the latter solid ion exchanger electrode. However, it is to be understood that any of the other forms of ion-sensitive barriers discussed above may be utilized in such embodiment.

In one commercially available ion-measuring electrode employing a solid ion exchanger barrier, for the reasons which will be discussed in detail later, several problems have been encountered in providing adequate sealing to prevent sample from reaching the electrolyte within the body of the electrode and in preventing electrolyte within the electrode from contacting the metal conductor connected to the electrostatic shield sealed within the wall of the electrode body. Moreover, some difficulty and significant expense has been encountered in providing an electrolyte filling port in the body of the electrode. The aforementioned commercial electrode has a further deficiency of sample holdup adjacent to the ion exchanger barrier, that is, small drops of sample may become lodged about the barrier and interfere in the ion concentration measurements when the electrode is shifted from one sample to another, or when the ion concentration of the sample changes such as may occur in a process stream.

SUMMARY OF THE INVENTION

The principal object of the present invention is to provide an improved ion-measuring electrode assembly which overcomes the deficiencies in the aforementioned commercially available electrode assembly.

Another object of the invention is to provide an ion-measuring electrode in which a sensor assembly carrying the ion-sensitive barrier is removably mounted in the body of the electrode.

A further object of the invention is to provide an improved ion-measuring electrode which employs an organic ion exchanger liquid in the ion-sensitive barrier thereof.

According to the principal aspect of the present invention, there is provided an ion-measuring electrode comprising a sensor assembly which is removably mounted within a hollow electrode body. The sensor assembly is in the form of a capillary tube having an ion-sensitive barrier at its forward end and an open rear end. The sensor assembly is mounted in the electrode body in such a manner that the ion-sensitive barrier is exposed at the forward end of the body while the open rear end of the capillary tube is adjacent to the rear end of the electrode body. An internal half cell is immersed in electrolyte contained within the capillary tube, and a conductor extends from this half cell through the open end of the tube to a cap which closes the rear end of the electrode body. By this arrangement, the sensor assembly may be readily removed from the electrode body, thus permitting a variety of sensor assemblies incorporating different ion-sensitive barriers to be utilized in a single electrode body. In addition, since the sensor assembly is in the form of a capillary tube, the surface tension of the electrolyte on the wall of the tube will prevent the escape of the electrolyte from the open rear end of the tube during normal handling of the electrode. Thus, the electrolyte will not contact the walls of the electrode body, or any conductors or the electrostatic shield therein, and will be separated and thus isolated for a substantial distance from the sample at the exterior of the electrode. Also, as can be appreciated, an electrolyte filling port is not required in the electrode body since the sensor assembly may be readily removed for replacement of the electrolyte when desired.

According to another aspect of the invention, an ion-measuring electrode is provided in which an organic ion exchanger liquid immiscible with aqueous solutions is positioned in a capillary tube between an ion-permeable membrane which closes one end of the tube and an aqueous electrolyte in which an internal half cell is immersed. Due to the surface tension of the two liquids on the wall of the capillary tube, mixing of the liquids is prevented and, thus, the ion exchanger liquid will remain in contact with the membrane regardless of the disposition of the electrode.

Other objects, aspects and advantages of the invention will become apparent from the following description taken in connection with the accompanying drawing.

DESCRIPTION OF THE PREFERRED EMBODIMENTS

Figures 1, 2, 3, 6:
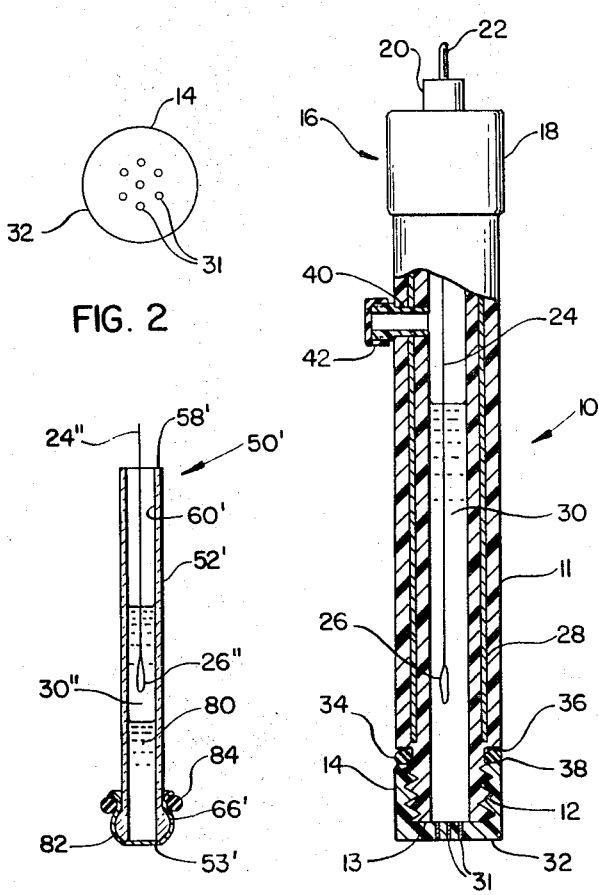
FIG. 1 is a partial longitudinal sectional view of a prior art ion-measuring electrode.
FIG. 2 is an elevational view of the forward end of the electrode illustrated in FIG. 1.
FIG. 3 is a side elevational view of the principle embodiment of the electrode assembly of the present invention shown as employing a solid ion-sensitive barrier.
FIG. 6 is a longitudinal sectional view of a modified form of the invention employing an organic ion exchanger liquid in the ion-sensitive barrier.

Referring now to FIGS. 1 and 2 in detail, there is illustrated a prior art electrode, generally designated 10, of the type briefly discussed above which has several deficiencies that are overcome by the present invention. The electrode 10 includes a hollow tubular electrode body 11 having a reduced diameter forward section 12 adjacent to the forward end 13. A cap 14 is threadedly engaged to the forward section 12. The cap and body are normally formed of a plastic material such as polypropylene, nylon, Teflon [polytetrafluoroethylene] or Delrin [a homopolymer of formaldehyde]. The rear end of the body 11 is closed by a cap assembly 16. This assembly may be of the type disclosed in U.S. Pat. No. 3,476,672 to Snyder et al. Such assembly includes a metal cap 18 and a pair of concentrically mounted electrical connectors 20 and 22 which protrude from the rear of the cap. These connectors are separated by a plastic sleeve not shown. The inner connector 22 is connected to a metal wire 24 that extends into the hollow body 11 and terminates in an internal half cell 26. The outer connector 20 is connected to a cylindrical metal electrostatic shield 28 which is embedded within the wall of the body 11. The body is partially filled with a suitable aqueous electrolyte 30 in which the half cell 26 is immersed.

As best seen in FIG. 2, a plurality of openings 31 extend through the forward wall 32 of cap 14. These openings are filled with a suitable solid ion exchanger material or ion exchanger incorporated in a solid plasticlike material such as collodion, such materials providing the ion-sensitive barrier for the electrode. An elastomeric O-ring 34 is positioned between a forwardly facing annular surface 36 on body 11 and the rear 38 of cap 14 for providing a seal between the cap and the body.

A plastic sleeve 40 is mounted in the sidewall of the body 11 to provide an electrolyte filling port for the electrode. This port is closed by an elastomeric cap 42.

One of the disadvantages of the above described prior art electrode 10 is that the electrolyte 30 is separated from the sample only by means of a single seal, namely the O-ring 34. As a consequence, any deterioration or failure of the O-ring will result in the sample contaminating the electrolyte, particularly since the electrolyte is in close proximity to the O-ring 34. In addition, electrolytic leaks and thus failure in operation of the electrode sometimes occurs due to the inability of a collodion barrier incorporating an ion exchanger sealing completely to the walls of the openings 30 in the plastic cap 14. In addition, it has been found that the electrode 10 has the deficiency that sometimes sample becomes trapped about the openings 31 in cap 14. This sample holdup adjacent to the ion exchanger material will result in errors in the output signal of the electrode when the electrode is shifted to different samples, or when the concentration of the ion being measured changes in a process flow stream, for example. Furthermore, it is somewhat difficult to seal the sleeve 40 in the wall of the body 12 of the electrode and also considerable care must be taken in completely sealing the interior of the cap assembly 16 so as to prevent the electrolyte 30 from making an electrolytic connection between the shield 28 and the conductor 24.

Figure 4:
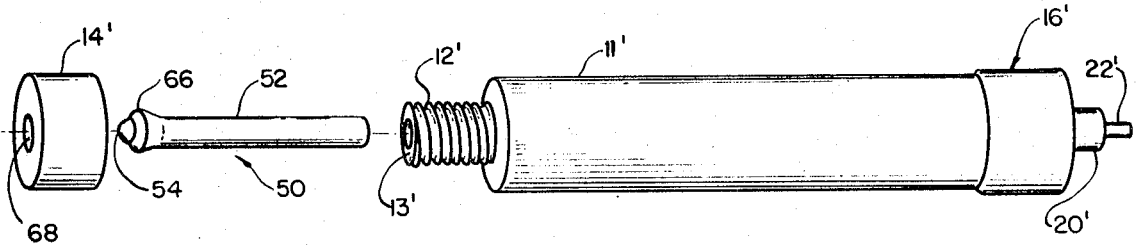
FIG. 4 is an exploded view, showing the end cap, the sensor assembly and electrode body of the electrode assembly illustrated in FIG. 3.
Figure 5:
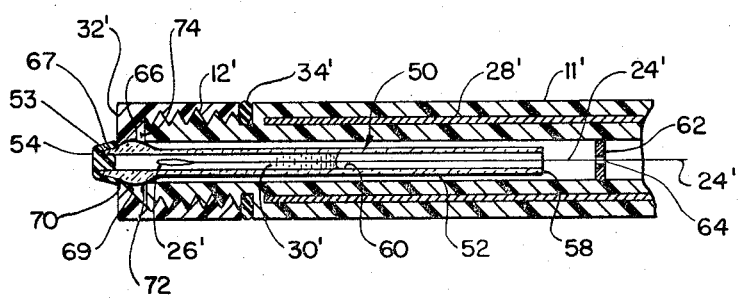
FIG. 5 is an enlarged, fragmentary, longitudinal sectional view of the forward end of the electrode assembly illustrated in FIGS. 3 and 4.

The principle embodiment of the electrode of the present invention is illustrated in detail in FIGS. 3-5, wherein reference numerals like those utilized in FIGS. 1 and 2 with primes are employed to indicate like or corresponding parts. As can be seen from FIGS. 3 and 4, and will be appreciated from the following description, the electrode 10' does not embody an electrolyte filling port in the wall of the electrode body 11'. The electrode 10' comprises three basic components, namely the hollow body 11', cap 14' and a sensor assembly, generally designated 50, which is removably mounted in the body 11' by means of the cap.

The sensor assembly 50 comprises an elongated tube 52 which is closed at its forward end 53 by an ion-sensitive barrier 54 which is solid and immiscible with aqueous solutions. The tube is open at its rear end 58. If the ion-sensitive barrier 54 is formed of collodion incorporating an ion exchanger as in the previously discussed commercial electrode, preferably the tube 52 is formed of nonion-sensitve glass, since the collodionion exchanger mixture seals better to glass than to plastic. If it is desired that the barrier be sensitive to calcium ions, the ion exchanger may be an organophosphoric acid, organophosphonic acid, or salts of these acids or mixtures of the salts and acids. Other ion exchanger materials could be utilized which are sensitive to other cations or to anions. Likewise, other plasticlike materials, such as resin, triphenylphosphate, and nylon. If the ion exchanger is solid at room temperature, it may be utilized alone and need not be incorporated in a plasticlike material such as collodion. Depending upon the particular plastic material and ion exchanger employed in the barrier 54, under some circumstances the barrier material might seal better to a plastic than to a glass tube 52. Therefore, it is to be understood that the invention is not limited to a construction in which the tube 52 is formed of glass. As will be appreciated, the advantages of the invention will be achieved even if the barrier 54 incorporates an ion exchanger in liquid form, such as will be described in connection with FIG. 6, or if the barrier is formed of other solid materials such as metal halides, glass, etc.

It is an important feature of the invention that the passage 60 extending through the tube 52 have a capillary dimension so that the surface tension of electrolyte 30' on the wall of the passage will prevent the escape of the electrolyte from the open rear end 58 of the tube during normal handling of the electrode. By the term normal handling, reference is made to those conditions under which the electrode is normally utilized in the laboratory and field for measuring the ion concentration of solutions, including when the electrode is inverted or even dropped, but excludes extraordinary conditions such as when the electrode would be shaken vigorously and thus subject to severe centrifugal force which would cause the electrolyte to escape from the rear 58 of tube 52.

As seen in FIG. 5, the electrolyte 30' fills only the forward portion of the passage 60 so as to provide a substantial open space between the meniscus of the electrolyte and the rear 58 of the tube 52. The internal half cell 26' of the electrode is immersed in the electrolyte 30' within passage 60 and the conductor 24' for the half cell extends to the cap assembly 16' where it is connected to the inner connector 22'. A circular disc 62 is fixedly positioned in the hollow body 11' behind the rear 58 of the sensor assembly 50. The conductor 24' passes through an opening 64 in the center of the disc 62. Thus, the disc 62 serves as a centering device for ensuring that the conductor 24' is coaxially positioned within the hollow body 11'. This arrangement facilitates the insertion of the half cell 26' into the sensor assembly 50 when the latter is mounted in the electrode body 11' as will be seen later.

Preferably the conductor 24' is a silver wire which is coated at its lower end with silver chloride to form to half cell 26'. The electrostatic shield 28' is connected to the outer connector 20 of the cap assembly 16' as in the electrode illustrated in FIG. 1. However, unlike the electrode 10, in the electrode 10' less care is required to seal the rear of the electrode body 11 by means of an epoxy or the like since the electrolyte 30' is trapped within the capillary passage 60. In addition, the centering device 62 serves as a seal between the assembly 50 and the cap 16'.

An outwardly extending flange 66 is formed on the tube 52 at a point spaced from its forward end 53, providing between such end and the flange a support 67 for the ion-sensitive barrier 54.

The forward wall 32' of cap 14' is formed with a central opening 68 and a rearwardly facing conical surface 69 which bears against the front face 70 of flange 66. Thus, when the cap 14' is threaded onto the forward section 12' of the body 11', the rear face 72 of the flange will be urged into sealing engagement with the end 13' of the body. If desired, a sealing gasket or O-ring (not shown) may be positioned in the annular space 74 between the surface 69 of the cap and the end 13' of the body 11', although such a seal is normally not required. By this arrangement, it can be appreciated tat the electrolyte 30' is separated from the sample outside of the electrode assembly 10' by not only the elastomeric seal 34' but also the seal provided between the flange 66 and the end 13' of the electrode body and also the substantial open space between the seals and the electrolyte 30' within the removable sensor assembly 50. Thus, even if the seals provided in the assembly 10' were to fail, the sample would have an extremely long distance to travel before it would reach the electrolyte 30' to contaminate the same and form an electrical leak path.

When the sensor assembly 50 is mounted in the electrode body 11' by means of the cap 14', the barrier support 67 extends through the opening 68 in the cap and beyond the forward face of the cap. Preferably the ion-sensitive barrier material 54 extends over the forward end 53 and outer surface of the support 67 in the form of a coating so that any previous sample which is held-up or trapped adjacent to the cap 14' will have a substantial distance to travel before t is sensed by the electrode. Preferably the barrier 54 is formed on the tube 52 by merely dipping the end of the tube forward of the flange 66 in a mixture of an ion exchanger and a plasticlike material dissolved in a solvent and thereafter allowing the mixture to cure into a hard mass such as shown in FIG. 5.

In assembling the electrode 10' of the invention, the sensor assembly 50 is initially partially filled with electrolyte 30', preferably by means of a syringe. The open rear end 58 of assembly 50 is then positioned within the hollow body 11', in a manner so that the half cell 26' is received in the capillary passage 60 of the assembly. Thereafter the cap 14' is threaded onto the forward end of the electrode body 11' until the flange 66' of the assembly 50 is firmly seated against the end 13' of the body.

It has been found that a sensor assembly 50 formed of glass and having a capillary passage of a diameter of 0.08 inch is quite satisfactory, when the internal half cell conductor has a diameter of 0.025 inch, to prevent the escape of electrolyte from the open rear end of the assembly. It is to be appreciated that such dimensions are given by way of example only and not by limitation. For example, a smaller diameter passage may be required if the electrode is going to be subjected to sever forces. On the other hand, the diameter passage 60 in the assembly 50 may be substantially greater than 0.08 inch if the outer diameter of the wire 24' is sufficiently great to still provide between the outer surface of the wire and the wall of the passage an annular passageway of capillary dimension.

Referring now to FIG. 6, wherein reference numerals like those utilized in FIGS. 3-5 with primes are employed to designate like or corresponding parts, there is illustrated a modified form of the sensor assembly 50' which may be mounted in the electrode body shown in FIGS. 3-5. The sensor assembly 50' differs from assembly 50 in the use of an organic ion exchanger liquid 80 which is immiscible with aqueous solutions and is retained in the tube 52' by an ion-permeable barrier 82. The liquid 80 may be a liquid ion exchanger or solid ion exchanger dissolved in an organic solvent. By way of example, the barrier 82 may be a cellophane membrane, and the ion exchanger solution 80 maybe an organophosphoric acid or salt, or both, dissolved in n-decanol. Other membranes, ion exchangers and solvents which may be utilized are disclosed in U.S. Pat. Nos. 3,429,785 and 3,438,886. When the assembly 50' is mounted in the electrode body 11' by the cap 14' is shown in FIGS. 3-5, the membrane 82 will be retained over the end 53' of tube 52' by the cap. However, if it is desired to utilize the assembly 50' alone as an ion-measuring electrode, an elastomeric O-ring 84 or the like may be utilized to hold the membrane 82 tightly over the end 53' of tube 52'. Also, if the assembly 50' is utilized alone, a cap (not shown) would close the open end 58° of tube 52' and fixedly mount the conductor 24'' for the half cell 26'' within the assembly so that the half cell would be immersed in the electrolyte 30''.

It is important for successful operation of assembly 60' that the ion exchanger liquid 80 be in the complete and continuous contact with the membrane 82. However, typically the aqueous electrolyte 30'' has a specific gravity greater than that of the liquid 80. As such, one would expect that when the assembly is positioned upright as shown in FIG. 6, the aqueous electrolyte would drop, thus displacing the ion exchanger liquid 80 adjacent to the membrane 82. However, we have discovered that because of the capillary dimension of passage 60' in tube 52', the aforementioned displacement of liquid 80 does no occur, but rather the two liquids 30'' and 80' remain in their respective desired positions in the tube during normal handling of the assembly. This ensures proper functioning of the electrode over long periods of time.

As can be appreciated, by the present invention, different sensor assemblies 50, 50' employing ion-sensitive barriers capable of sensing different ions may be mounted in a single electrode body, thus not only facilitating the manufacture of a wide variety of ion-measuring electrodes, but also permitting the user of the electrode to incorporate a variety of sensor assemblies 50, 50' within one electrode body.

While several embodiments of the invention have been disclosed herein for purposes of illustration, it will be understood that various changes can be made in the form, details, arrangement and proportions of the various parts in such embodiments without departing from the spirit and scope of the invention as defined by the appended claims.

What is claimed is:

1. An electrode assembly for measuring the ion concentration of a solution comprising:
    a first hollow tubular member having an open forward end and a rear end closed by a cap;
    a second hollow tubular member having an open rear end and a forward end closed by an ion-sensitive barrier;
    means removable mounting said second member coaxially within said first member in sealing relationship therewith and in a position so that said barrier is exposed adjacent to said forward end of said first member and said rear end of said second member is adjacent to said rear end of said first member;
    an internal half cell positioned within said second member adapted to be immersed in a liquid electrolyte therein contacting said barrier;
    a conductor extending rearwardly from said internal half cell through said rear end of said second member of said cap; and
    said conductor and said second member being dimensioned to provide therebetween a capillary passage sufficiently small to prevent flow of electrolyte from said second member through rear end thereof into said first member during normal handling of the assembly.

2. An assembly as set forth in claim 1 wherein:
    said mounting means comprises a second cap threadedly engaged to said first member adjacent the forward end thereof, said cap having an opening therethrough coaxial with said barrier;
    said second member is formed with an outwardly extending flange adjacent to said forward end thereof, said flange engaging the forward end of said first member; and
    said second cap including a rearwardly facing surface engaging said flange and urging the same into sealing engagement with said forward end of said first member.

3. An assembly as set forth in claim 2 wherein:
    said flange is spaced rearwardly from said forward end of said second member to provide a tubular barrier support forward of said flange;
    said barrier is mounted on said support; and
    said support extends through the opening in said cap and beyond the forward face of said cap.

4. An assembly as set forth in claim 3 wherein:
    said barrier comprises a solid, plasticlike material having an ion exchanger incorporated therein; and
    said material fills the forward end portion of said barrier support and extends in the form of a coating over said forward end and the outer surface of the portion of said support that extends beyond said forward face of said cap.

5. An assembly as set forth in claim 1 wherein:
    said barrier comprises a solid, plasticlike material having an ion exchanger incorporated therein; and
    said material fills the forward end portion of said second member and extends over said forward end and the outer surface thereof in the form of a surface coating.

6. An assembly as set forth in claim 1 wherein:
    said conductor is a wire coaxially positioned within said first member.

7. An assembly as set forth in claim 6 including:
    positioning means in said first member for maintaining said wire coaxially positioned in said first member.

8. An assembly as set forth in claim 1 wherein:

said first member is formed of a plastic and said second member is formed of nonconductive glass.

9. An electrode assembly comprising:

a capillary tube having a forward end closed by an ion-sensitive barrier and an open rear end;

a hollow tubular member surrounding said tube;

said tubular member having a closed rear end and an open forward end;

cap means removably mounted on said forward end of said tubular member, said cap means fixedly holding said capillary tube in said tubular member with said barrier being exposed to the exterior of said member adjacent the forward end thereof;

an internal half cell positioned within said capillary tube; and a conductor extending from said half cell through said open rear end of said capillary tube to said rear end of said tubular member.

10. An electrode assembly as set forth in claim 9 wherein:

the wall of said tubular member is devoid of an electrolyte filling port.

11. An electrode assembly comprising:

a sensor assembly comprising a tubular member having a capillary passage therethrough and an ion-sensitive barrier closing the forward end of said passage, the rear end of said passage being open;

a hollow electrode body;

means removably mounting said sensor assembly in said body; and an internal half cell carried by said body and extending into said capillary passage through said rear end thereof.

12. An electrode assembly for measuring the ion concentration of a solution comprising:

a body having an elongated capillary passage therein;

an ion-permeable barrier closing one end of said passage and adapted to contact said solution;

an organic ion exchanger liquid substantially immiscible with said solution filling the portion of said passage immediately adjacent to said barrier;

an aqueous electrolyte substantially immiscible with said liquid located in said passage in contact with said liquid at the surface thereof remote from said barrier;

an internal half cell positioned in said passage to contact said electrolyte; and said liquid and electrolyte remaining in their relative positions in said passage due to the surface tension thereof on the wall of said passage.

* * * * *